(12) United States Patent
Laube et al.

(10) Patent No.: US 9,309,087 B2
(45) Date of Patent: Apr. 12, 2016

(54) RETRACTABLE CABLE AND CABLE REWIND SPOOL CONFIGURATION

(71) Applicant: AMX, LLC, Richardson, TX (US)

(72) Inventors: Douglas N. Laube, Farmersville, TX (US); Michael Woodford Freitas, Colleyville, TX (US)

(73) Assignee: AMX LLC, Richardson, TX (US)

( * ) Notice: Subject to any disclaimer, the term of this patent is extended or adjusted under 35 U.S.C. 154(b) by 177 days.

(21) Appl. No.: 14/296,631

(22) Filed: Jun. 5, 2014

(65) Prior Publication Data

US 2014/0377983 A1    Dec. 25, 2014

Related U.S. Application Data

(60) Provisional application No. 61/837,279, filed on Jun. 20, 2013.

(51) Int. Cl.
| | |
|---|---|
| *B65H 75/44* | (2006.01) |
| *B65H 75/48* | (2006.01) |
| *H01B 7/06* | (2006.01) |
| *H01R 13/72* | (2006.01) |
| *H02G 11/02* | (2006.01) |

(52) U.S. Cl.
CPC ........ *B65H 75/4402* (2013.01); *B65H 75/4431* (2013.01); *B65H 75/4442* (2013.01); *B65H 75/4449* (2013.01); *B65H 75/4457* (2013.01); *B65H 75/486* (2013.01); *H01B 7/06* (2013.01); *H01R 13/72* (2013.01); *B65H 2701/34* (2013.01); *H02G 11/02* (2013.01)

(58) Field of Classification Search
CPC .......... B65H 75/4431; B65H 75/4442; B65H 75/4449; B65H 2701/34; B65H 75/4402; B65H 75/4457; B65H 75/486; H01R 13/72; H01B 7/06; H02G 11/02
USPC ......... 439/501, 4, 956, 146; 242/160.4, 378.4
See application file for complete search history.

(56) References Cited

U.S. PATENT DOCUMENTS

| | | | | |
|---|---|---|---|---|
| 6,077,108 | A * | 6/2000 | Lorscheider | B65H 75/44 439/4 |
| 6,299,477 | B1 * | 10/2001 | Rohrbach | H01R 13/72 439/146 |
| 6,325,665 | B1 * | 12/2001 | Chung | H01R 13/72 439/501 |
| 6,461,191 | B1 * | 10/2002 | Chung | B65H 75/4449 242/378.1 |

* cited by examiner

*Primary Examiner* — Edwin A. Leon (57) ABSTRACT

A spool apparatus is described to include in one particular example a cable spool with a first cylindrical lip and a second cylindrical lip on an opposite side of the cable spool. A center of the spool includes a clutch bearing in the center of both the first cylindrical lip and the second cylindrical lip that provides a rotational axis for the cable spool to rotate around. The apparatus may also include a feed slot near the first cylindrical lip that provides a passage for cable to pass from the second cylindrical lip to the first cylindrical lip.

18 Claims, 8 Drawing Sheets

RETRACTABLE CABLE AND CABLE REWIND SPOOL CONFIGURATION

CROSS-REFERENCE TO RELATED APPLICATIONS

This application claims priority to U.S. provisional patent application Ser. No. 61/837,279 entitled RETRACTABLE CABLE AND CABLE REWIND SPOOL CONFIGURATION, filed Jun. 20, 2013, the entire contents of which are herein incorporated by reference.

TECHNICAL FIELD OF THE APPLICATION

This application relates to an apparatus for retracting a cable into a cable spool and in particular to a cable rewinding spool that securely holds the wound cable in a secure position.

BACKGROUND OF THE APPLICATION

Conventionally, cable spools are often passive and offer no functionality beyond a round body that a cable may be wound around in order to store the cable until it requires unwinding. The process of winding and unwinding cable within spools requires flexibility and optimization in order to provide quick and efficient access to the coiled conduit provided on the spool. Additionally, the release of the cable and the ability to remove the cable from the spool, stop the cable from being removed and rewind the cable are all important characteristics to be considered in an optimal cable spool configuration.

SUMMARY OF THE APPLICATION

One embodiment of the present application may include an apparatus that includes a cable spool with a first cylindrical lip and a second cylindrical lip on an opposite side of the cable spool and a clutch bearing in the center of both the first cylindrical lip and the second cylindrical lip that provides a rotational axis for the cable spool to rotate around, and a feed slot adjacent the first cylindrical lip that provides a passage for cable to pass from the second cylindrical lip to the first cylindrical lip.

Another embodiment may include an apparatus that includes a cable spool housing including a back plate and a front plate, a cable spool with a first cylindrical lip on a first side of the cable spool housing and a second cylindrical lip on a second side of the cable spool housing opposite the first side and a cable wound around the first cylindrical lip and the second cylindrical lip, and a clutch bearing in the center of both the first cylindrical lip and the second cylindrical lip that provides a rotational axis for the cable spool to rotate around.

Another example embodiment may include an apparatus that includes a first cable spool comprising a first cylindrical lip, a second cable spool affixed to an opposite side of the first spool comprising a second cylindrical lip that is smaller in diameter than a diameter of the first cylindrical lip, a clutch bearing in the center of both the first cylindrical lip and the second cylindrical lip that provides a rotational axis, and a feed slot contiguous with the first cylindrical lip that provides a passage for cable to pass from the second cylindrical lip to the first cylindrical lip.

Another example embodiment may include an apparatus that includes a cable spool with a spool gear on an exterior surface of the cable spool which rotates around a first clutch bearing, and a cable spool brake with a second clutch bearing, and a toothed gear disposed on the second clutch bearing that is in direct contact with the spool gear to regulate movement of the cable spool and associated cable removal of cable wrapped around the cable spool.

Another example embodiment may include an apparatus that includes a clutch bearing, and a toothed gear disposed on the clutch bearing that is in direct contact with a spool gear to regulate movement of a cable spool and associated cable removal of cable wrapped around the cable spool, and a spring biased release lever that regulates movement of the toothed gear.

DETAILED DESCRIPTION OF THE APPLICATION

It will be readily understood that the components of the present application, as generally described and illustrated in the figures herein, may be arranged and designed in a wide variety of different configurations. Thus, the following detailed description of the embodiments of an apparatus, and system configuration, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

Figure 1:
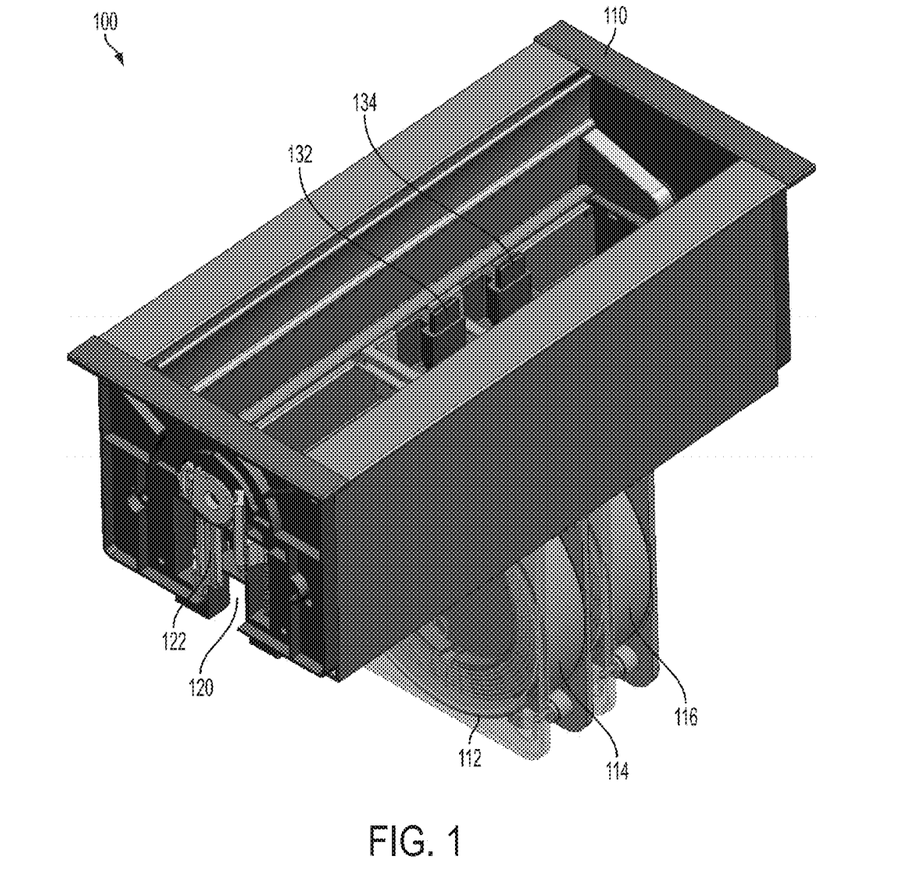
FIG. 1 illustrates an example cable spool housing mounting device having two mounted dual spools according to example embodiments of the present application.

FIG. 1 illustrates an example cable spool housing mounting device having two mounted dual spools according to example embodiments of the present application. Referring to FIG. 1, the combination housing and dual spool configuration 100 provides a housing 110 with an entrance portion 120 and a slidable track 122 with two tracks which provides a resting surface for the various dual spool devices 112 (114 and 116). More dual spool devices may be added to the housing so more cable can be made available in the corresponding housing 110. The top of the dual spool devices 114 and 116 have retractable cables affixed to electronic interfaces 132 and 134, respectively (e.g., VGA, HDMI, serial cable, RCA, USB, etc.)

Figure 2:
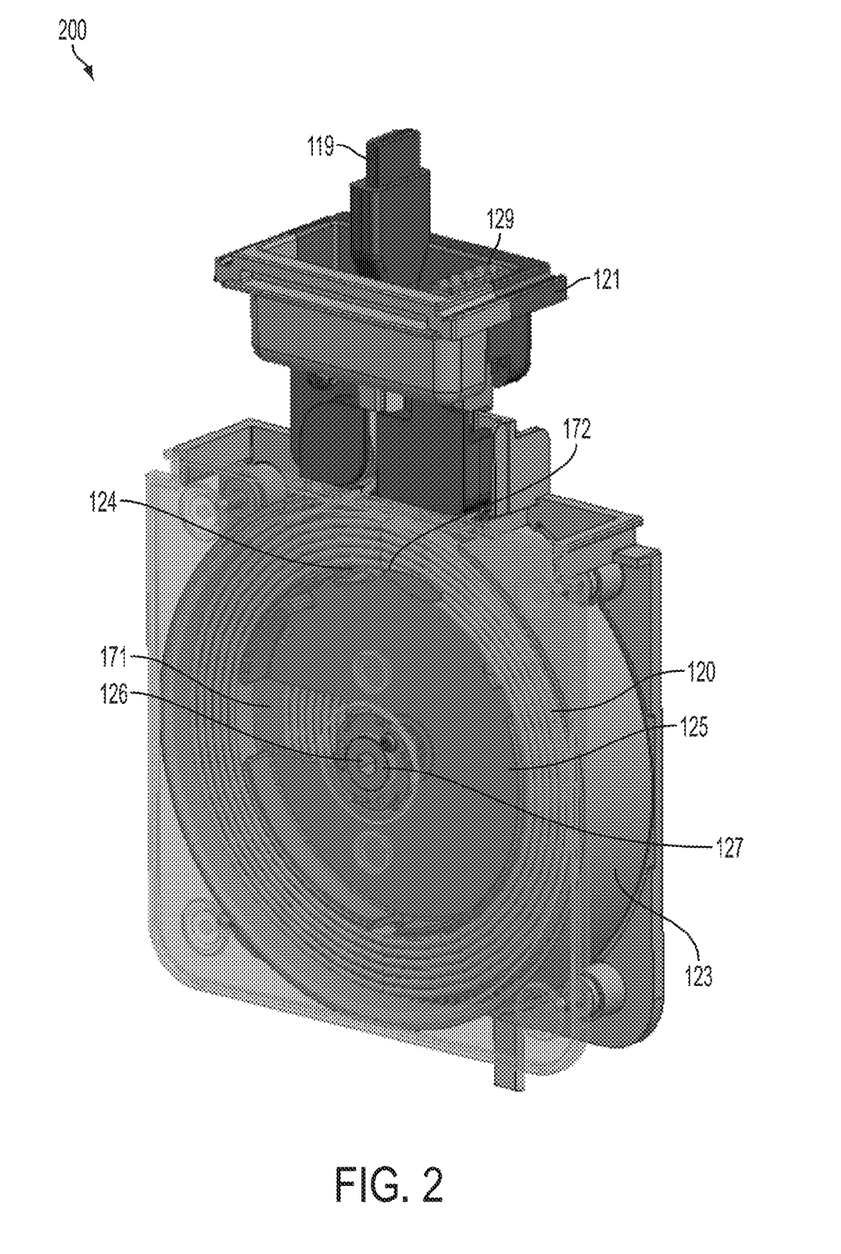
FIG. 2 illustrates an example front view of an individual dual spool configuration according to example embodiments of the present application.

FIG. 2 illustrates an example front view of an individual dual spool configuration according to example embodiments of the present application. Referring to FIG. 2, the dual spool configuration 200 provides a front perspective with an electronic communications interface (i.e., VGA) interface 119 at the end of the cable which is wound onto the spool. Also, the dual spool device may also have a cylindrical lip that provides a resting surface 124 for the cable to be wrapped around. The resting surface has two gaps 171 and 172 in its cylindrical surface. The center of the dual spool is a drive adaptor 126 that turns via contact with a clutch bearing 127. The outside surface 123 provides a protective layer that keeps other objects away from the coiled cable 120 which is wrapped around the cylindrical lip 124 multiple times. Under the lip 124 is a power spring/spool spring 125 (i.e., clock spring) that is engaged to rewind the cable or wire 120 via a retractable force that increases proportionally to the amount that the spool is unwound in the same direction as the cable is pulled from the spool. A spool supporting protrusion 121 provides a way to secure the spool configuration to a supporting structure as illustrated in FIG. 1 and a resting surface for the cable and corresponding interface 119. The VGA interface may be resting on a surface of the spool supporting protrusion 121 as it is kept firmly in place by the tension from power spring band 125 which holds the cable in place.

Figure 3:
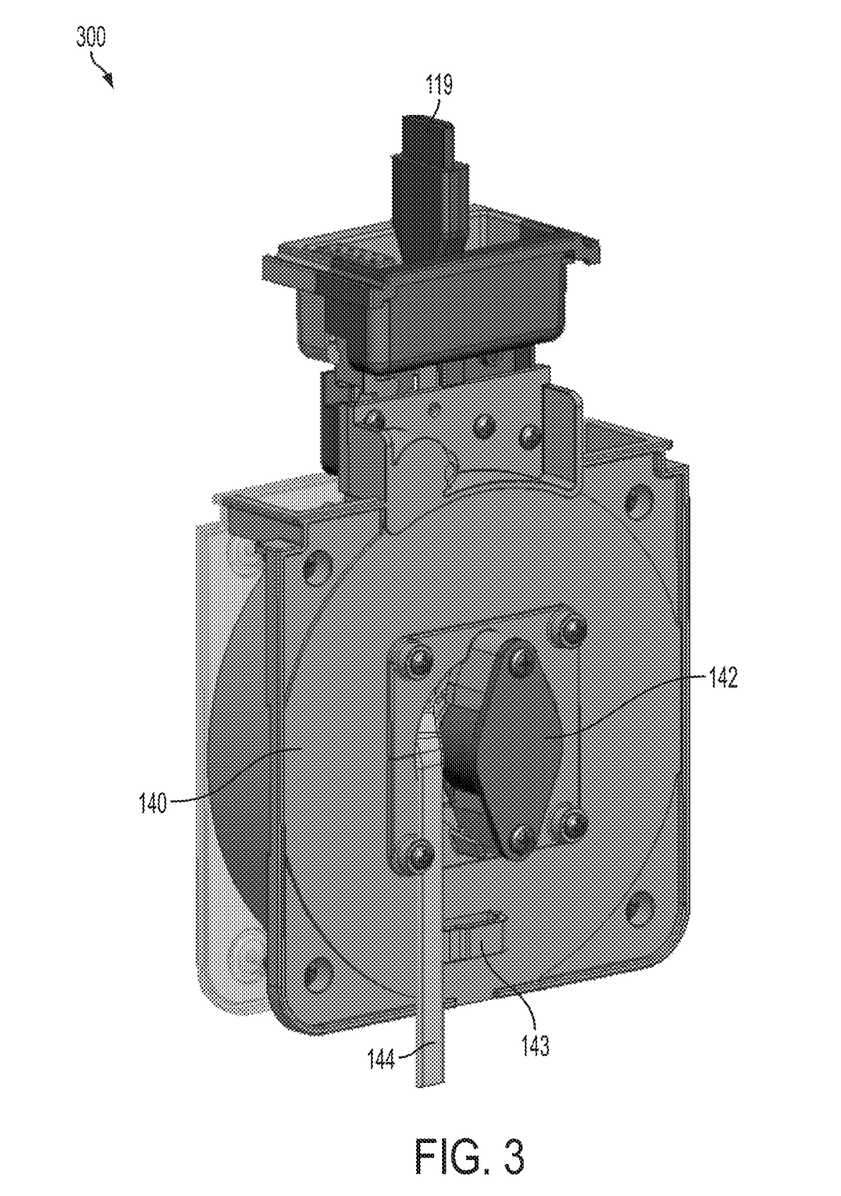
FIG. 3 illustrates an example rear view of an individual dual spool configuration according to example embodiments of the present application.

FIG. 3 illustrates an example rear view of an individual dual spool configuration according to example embodiments of the present application. Referring to FIG. 3, the rear view perspective 300 illustrates a pigtail cable 144 that feeds into the rear cylindrical lip on the backside or back plate 140 of the dual spool configuration opposite the front side or front plate. A diamond-shaped dampener 142 controls the rewind rate of the spool. A hook or slot 143 provides an aligned cable position for feeding the cable to the spool or removing it accordingly. The dampener 142 connects to the spool through the clutch bearing 126 in the center of the spool permitting the spool to "free turn" when unwinding, and then on the rewinding procedure, the clutch bearing 126 locks and drives the dampener 142 to control the rewind rate. In FIG. 3, the cable is exiting from the mount of the clutch bearing. This permits the cable to exit the unit while being affixed to the unit with the "hook" 143.

Figure 4:
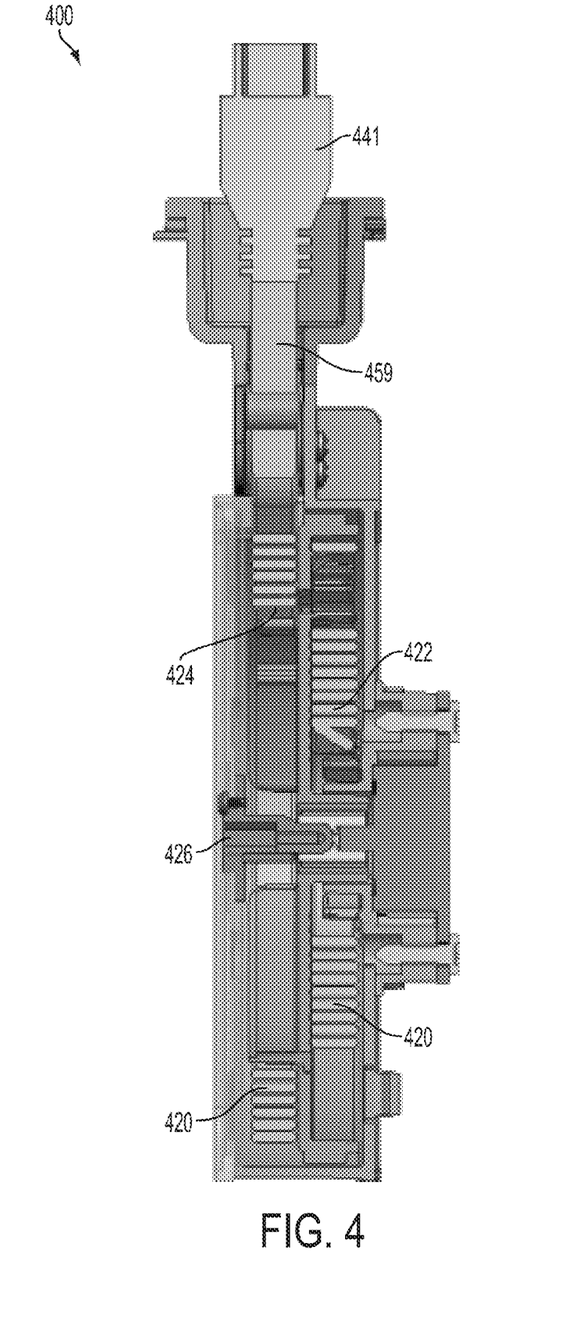
FIG. 4 illustrates an example side internal view of an individual dual spool configuration according to example embodiments of the present application.

FIG. 4 illustrates an example side internal view of an individual dual spool configuration according to example embodiments of the present application. Referring to FIG. 4, the internal perspective 400 includes a center portion or drive adaptor 426, which the dual spool turns around in a circular motion 360 degrees. The first cylindrical lip 424 is larger in diameter than the second cylindrical lip 422 on the rear side of the dual spool. The cable 420 may be wound around the second cylindrical lip 422 and fed through to the front side to be also wound around the first cylindrical lip 424. The first and second cylindrical lips are on opposite sides of the dual spool body and are sized differently. At least one of the cylindrical lips has a gap to allow the cable to pass through to the other side of the dual spool configuration (see gaps 171 and 172 FIG. 2). At the top of the spool configuration is a cable interface 441 and the cable 459 attached to the interface for easy access to an electronic device.

Figure 5:
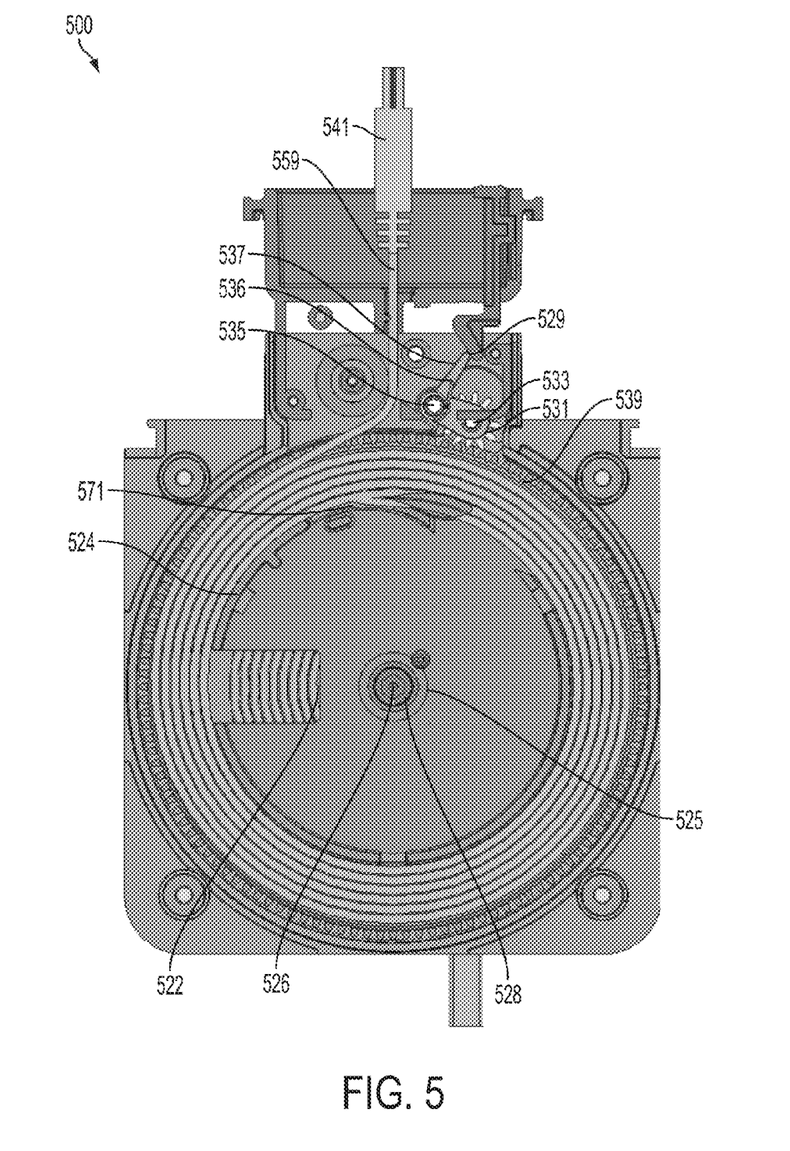
FIG. 5 illustrates an example front internal view of an individual dual spool configuration according to example embodiments of the present application.

FIG. 5 illustrates an example front internal view of an individual dual spool configuration according to example embodiments of the present application. Referring to FIG. 5, the internal view 500 includes a driver adaptor 526 which turns the spool around a center axis via a friction reducing clutch bearing 528. A cylindrical lip having a smaller diameter 522 is located on the rear side of the dual spool housing and has cable coiled around it in a circular manner which is then fed through a feed slot 571 to the front of the dual spool which has a cylindrical lip 524 with a larger diameter than that of the rear/smaller cylindrical lip. The same cable piece may be continuously wrapped around both the smaller and the larger cylindrical lips even though they are on opposite sides of the dual spool configuration.

Figure 7:
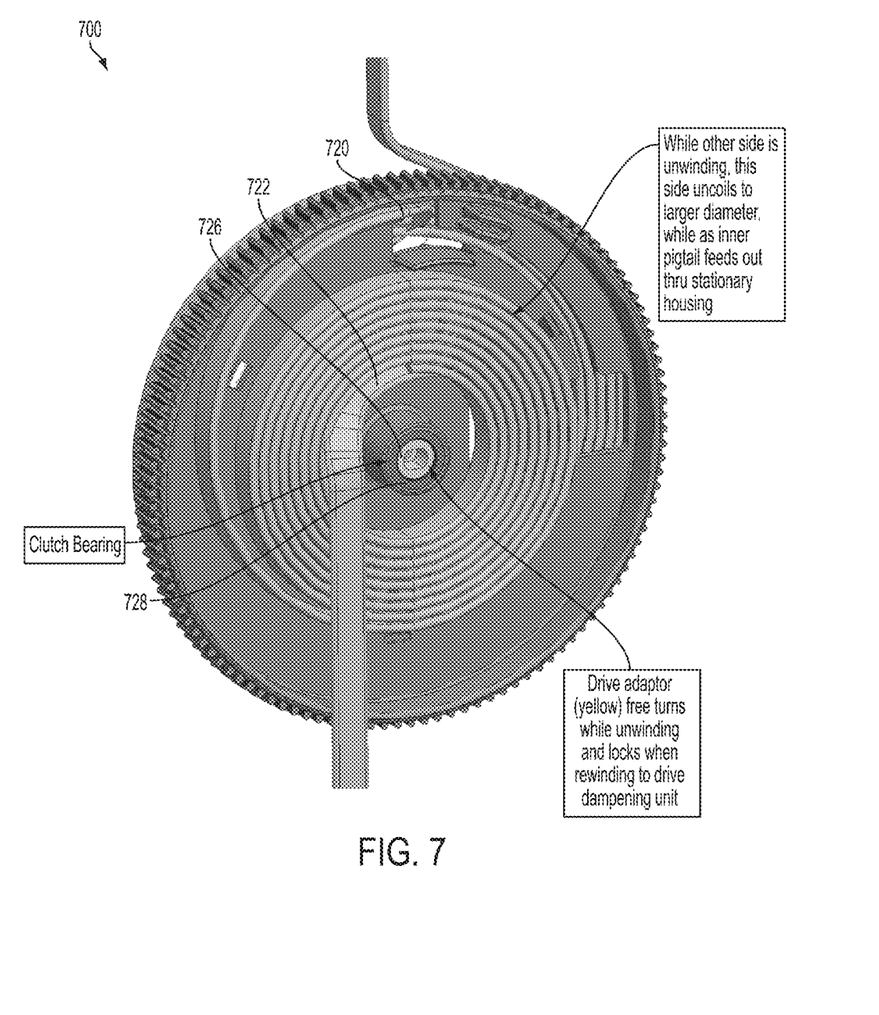
FIG. 7 illustrates an example internal perspective of a rear view of the dual spool configuration according to example embodiments.

The outside perimeter 539 of the larger cylindrical lip 524 includes metallic gears (i.e., teeth) which mesh with a smaller gear 531. There are two clutch bearings one in the center of both spools 526, which is the center wheel and which rides on a shaft that is connected to a clutch bearing portion which is also illustrated in FIG. 7. For example, drive adapter 726 is the axle on which the clutch bearing rotates. The center, or 'd-hole' portion, of the dampener shaft is the drive adapter 726. The other clutch bearing 533 is part of the brake configuration which includes the pivot arm 537, the release lever 529, the pivot arm rotational spring 536 and the axle 535.

In operation, if a user is winding the cable, the spring 525 would be biased to unwinding the cable all the time and may slow down the unwinding because of the dampener 142. When it is rewinding, it rewinds slowly because of the dampener 142 (see FIG. 3) and the corresponding connection to the drive adapter 726 on the other side (see FIG. 7).

When unwinding or unrolling the spool, no dampener would result in the spool unwinding easily without exerted effort. A second clutch bearing 533 is mounted inside the smaller gear 531. This second clutch bearing 533 is on a "pivot arm" 537. There are 2 axles 533 and 535 on which the pivot arm 537 pivots. There is a rotational spring 536 (exaggerated for clarity) on the shaft of the pivot arm 537 which is biased between the pivot arm and the casing of the pivot arm, and the biasing keeps the small gear 531 engaged with the larger gear 539 for biasing downwards toward the larger gear 539 in a clockwise rotational direction.

There is an axle that passes through the pivot arm 537 and through the clutch bearing 533 and out through the other end of the pivot arm 537. The axle is locked to the pivot arm so it will not rotate since it is the axle for the clutch bearing 533 for that gear 531 on which it spins. In one direction, the gear 531 will not turn as it locks the larger wheel gear 539 and in the other it turns freely.

In operation, the wheel and gear 539 will turn clockwise and unwind the yellow flat cable, and in turn, the little gear 531 will turn counter clockwise and allow a user to freely pull the cable out of the spool as it is attached to an electronics adaptor 541. The gears 531 and 539 are operating on clutch bearings 533 and 528 so if a user were to stop pulling the spool won't rewind since the little gear is engaged and locked. However, in order to rewind, the lever or handle 529 may be pushed for biasing the pivot arm 537 counter-clockwise and disengaging the small gear 531.

Figure 8:
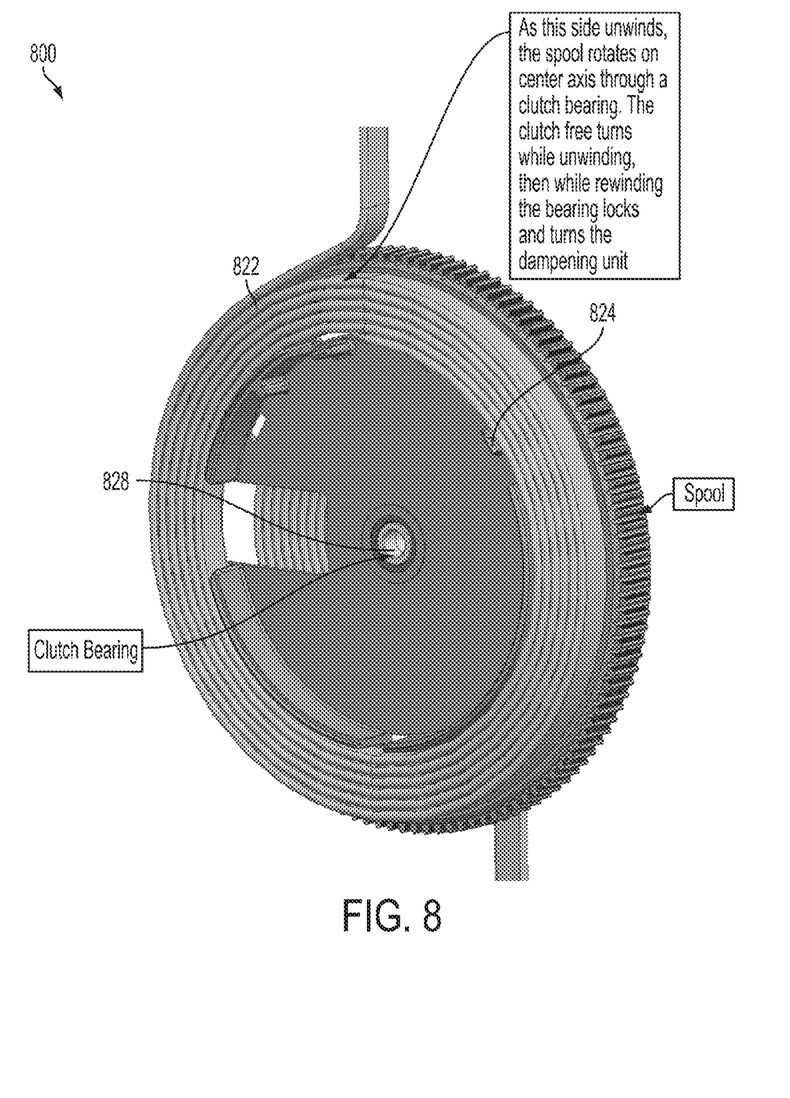
FIG. 8 illustrates an example internal perspective of a front view of the dual spool configuration according to example embodiments.

In FIG. 8, when unwind cable 822, may turn clockwise up to six times, for example, before it is fully extended. In FIG. 7, the wire is wound tight in the smaller diameter of the spool and is tucked into the opening to the larger diameter on the other side. As the wheel turns clockwise, it unspools into a bigger diameter on the same side, it unrolls into a bigger diameter so the cable can unwind on one side without twisting and turning on the other side.

The individual spool configuration also includes a brake configuration that includes the clutch bearing 533 and the spring 536 biased release lever. The clutch bearing 533 may be in contact with the cable to provide a breaking mechanism to reduce the slipping or undesired movement of the cabling or at least reduce the movement via a dampening coefficient.

According to one example embodiment, a cable spool housing such as the examples in FIGS. 2 and 3 may include a back plate and a front plate. The cable spool may have a dual spool configuration with a first cylindrical lip on a first side of the cable spool housing and a second cylindrical lip on a second side of the cable spool housing opposite the first side, and a cable wound around the first cylindrical lip and the second cylindrical lip. A clutch bearing in the center of both the first cylindrical lip and the second cylindrical lip may provide a rotational axis for the cable spool to rotate around when the cable is being wound into the spool or unwound from the spool. The dual spool configuration may include a feed slot contiguous with the first cylindrical lip that provides a passage for cable to pass from the second cylindrical lip to the first cylindrical lip. The first cylindrical lip may have a longer diameter than a diameter of the second cylindrical lip. A drive adaptor may be disposed through the clutch bearing to turn freely while the cable is being unwound from the spool and to lock when a rewinding movement of the spool is initiated.

A power spring band 125 may be affixed at a first end to an interior surface inside an area of the first cylindrical lip 124 and affixed at a second end to the clutch bearing 126, and the power spring band may be comprised of an elastic material that extends as the cable spool is rotated. A spool supporting protrusion 121 extending from a body of the cable spool housing may include an electronic data interface 119 affixed to one end of the cable and resting against an orifice and resting surface 129 in the spool supporting protrusion. The electronic data interface may be at least one of a video graphics adaptor (VGA), a universal serial bus (USB) interface and a high definition multimedia interface (HDMI). A dampener 142 may be affixed to the back plate of the spool housing in direct contact with the clutch bearing to reduce rotational speed of the spool. A brake may be part of the housing and may include another clutch bearing 533 and a spring biased release lever 539 that regulates movement of the clutch bearing to reduce undesired movement of the cable. The brake may also include a toothed gear 531 that is in direct contact with an outer gear 539 of the spool and which is rotated around the clutch bearing 533. The brake also include a pivot arm 537, and the spring biased release lever 529 is in direct contact with the pivot arm 537 and causes the pivot arm to stop movement of the toothed gear 531 when the spring biased release lever is in a closed position. Or, to permit movement of the toothed gear 531 when the spring biased release lever is in an open position.

Another example embodiment includes a cable spool with a spool gear 539 on an exterior surface of the cable spool which rotates around a first clutch bearing 528, and a cable spool brake that includes a second clutch bearing 533, a toothed gear 531 disposed on the second clutch bearing that is in direct contact with the spool gear to regulate movement of the cable spool and associated cable removal of cable wrapped around the cable spool. The cable spool brake further includes a spring biased release lever that regulates movement of the toothed gear. The cable spool brake further includes a pivot arm 537, and the spring biased release lever 529 which is in direct contact with the pivot arm and causes the pivot arm to stop movement of the toothed gear 531 when the spring biased release lever is in a closed position. The cable spool brake further includes a pivot arm, and the spring biased release lever is in direct contact with the pivot arm and causes the pivot arm to permit movement of the toothed gear when the spring biased release lever is in an open position. The pivot arm is attached to a first axle 535 and a second axle (with clutch bearing 533) and pivots around the first axle 535 when the spring biased release lever is shifted to make contact with the pivot arm. The toothed gear 531 rotates around the second axle/clutch bearing 533 which is also attached to the pivot arm. A diameter of the second clutch bearing 533 is smaller than a diameter of the first clutch bearing 528 at the center of the spool gear. The spring biased release lever is shifted via a depression actuation performed at a top portion of the spring biased release lever. A user may press the lever like a button to start and/or stop the movement of the spool gear and the exiting or unraveling of the cabling. The depression actuation of the spring biased release lever causes the pivot arm to engage the toothed gear with the spool gear.

Figure 6:
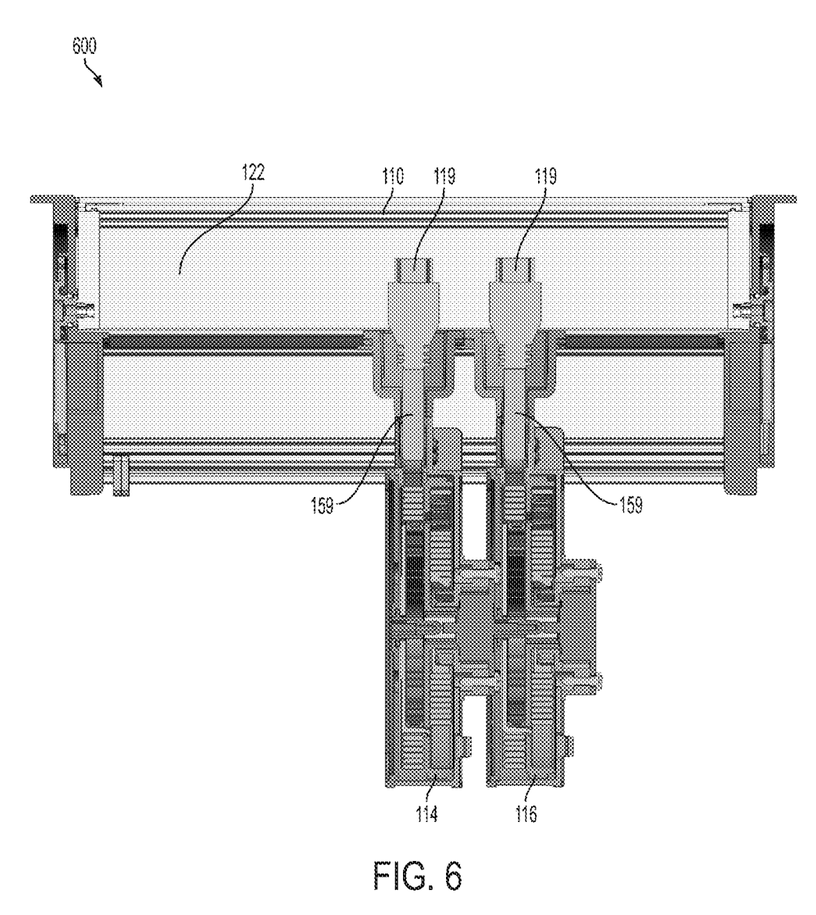
FIG. 6 illustrates an example internal view of a cable spool housing mounting device having two mounted dual spools according to example embodiments of the present application.

FIG. 6 illustrates an example internal view of a cable spool housing mounting device 600 having two mounted dual spools according to example embodiments of the present application. Referring to FIG. 6, the housing 110 has two dual spool devices 114 and 116 suspended by the securing track 122 and their respective securing mechanisms. The adaptors 119 are connected to the cabling 159 in the spools for ready access to a connection to a separate electronic computing device.

FIG. 7 illustrates an example internal perspective 700 of a rear view of the dual spool configuration according to example embodiments. Referring to FIG. 7, the rear view perspective 700 illustrates various layers of cable coiled around the smaller cylindrical lip 722 and which eventually fees through a feed slot 720 to the opposite side of the dual spool device so it may continue to be coiled around the larger cylindrical lip of the same dual spool device. The drive adaptor 726 is used to drive the spool so it may be unwound or rewound depending on the present use purposes. The clutch bearing 728 offers the drive adaptor 726 a friction reducing way to turn the spool freely and with ease. In operation, while the other side of the dual spool is unwinding the rear side may uncoil and feed the larger diameter cylindrical lip to provide additional cable and the inner pigtail source of cable feeds out through the stationary housing. The drive adaptor 726 may be configured to turn freely while unwinding occurs and lock when rewinding to drive the dampening unit. The outer or primary winding on the front side of the dual spool configuration is used for cable extension and retraction. In the start position, both the inner and outer windings on opposite sides of the dual spool configuration are wound tight to their respective small diameters. The inner (secondary) winding is wound on the small stationary diameter on the fixed wall, which permits the proximal cable-end to exit in a non-rotating fashion. The distal end of the secondary winding is affixed at the larger diameter on the front side, which then feeds through the center wall to become the primary winding. When the outer winding is unwound or extracted, the inner winding also unwinds, but to a larger diameter. As a result, one length of cable can unwind without the proximal end turning as it exits the dual spool configuration.

FIG. 8 illustrates an example internal perspective of a front view of the dual spool configuration according to example embodiments. Referring to FIG. 8, the front side of the dual spool configuration illustrates various layers of coiled cable 822 resting on the larger cylindrical lip 824 of the front portion of the dual spool configuration. The clutch bearing 828 is also the center point for this and the opposite side of the dual spool configuration. In operation, as this side unwinds, the spool rotates on a center axis through the same clutch bearing. The clutch turns freely while unwinding, however, during rewinding the bearing locks and turns the dampening unit.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

What is claimed is:

1. An apparatus comprising:
   a cable spool housing comprising a back plate and a front plate;
   a cable spool with a first cylindrical lip on a first side of the cable spool housing and a second cylindrical lip on a second side of the cable spool housing opposite the first side and a cable wound around the first cylindrical lip and the second cylindrical lip; and
   a clutch bearing in the center of both the first cylindrical lip and the second cylindrical lip that provides a rotational axis for the cable spool to rotate around.

2. The apparatus of claim 1, further comprising:
   a feed slot contiguous with the first cylindrical lip that provides a passage for cable to pass from the second cylindrical lip to the first cylindrical lip.

3. The apparatus of claim 1, wherein the first cylindrical lip has a longer diameter than a diameter of the second cylindrical lip.

4. The apparatus of claim 1, further comprising:
   a drive adaptor configured to turn freely while the cable is being unwound from the spool and to lock when a rewinding movement of the spool is initiated, and wherein the drive adaptor is positioned inside the clutch bearing.

5. The apparatus of claim 1, further comprising:
   a power spring band affixed at a first end to an interior surface inside an area of the first cylindrical lip and affixed at a second end to the clutch bearing, and wherein the power spring band is comprised of an elastic material that extends as the cable spool is rotated.

6. The apparatus of claim 1, further comprising:
   a spool supporting protrusion extending from a body of the cable spool housing.

7. The apparatus of claim 6, further comprising:
   an electronic data interface affixed to one end of the cable and resting against an orifice in the spool supporting protrusion.

8. The apparatus of claim 7, wherein the electronic data interface is at least one of a video graphics adaptor (VGA), a universal serial bus (USB) interface and a high definition multimedia interface (HDMI).

9. The apparatus of claim 1, further comprising:
   a dampener affixed to the back plate of the spool housing in direct contact with the clutch bearing to reduce rotational speed of the spool.

10. The apparatus of claim 1, further comprising:
    a brake comprising another clutch bearing and a spring biased release lever that regulates movement of the clutch bearing to reduce undesired movement of the cable.

11. The apparatus of claim 10, wherein the brake further comprises a toothed gear that is in direct contact with an outer gear of the spool and which is rotated around the another clutch bearing.

12. The apparatus of claim 11, wherein the brake further comprises a pivot arm, wherein the spring biased release lever is in direct contact with the pivot arm and causes the pivot arm to stop movement of the toothed gear when the spring biased release lever is in a closed position.

13. The apparatus of claim 11, wherein the brake further comprises a pivot arm, and wherein the spring biased release lever is in direct contact with the pivot arm and causes the pivot arm to permit movement of the toothed gear when the spring biased release lever is in an open position.

14. An apparatus comprising:
    a first cable spool comprising a first cylindrical lip;
    a second cable spool affixed to an opposite side of the first spool comprising a second cylindrical lip that is smaller in diameter than a diameter of the first cylindrical lip;
    a clutch bearing in the center of both the first cylindrical lip and the second cylindrical lip that provides a rotational axis; and
    a feed slot contiguous with the first cylindrical lip that provides a passage for cable to pass from the second cylindrical lip to the first cylindrical lip.

15. The apparatus of claim 14, further comprising:
    a drive adaptor configured to turn freely while the cable is being unwound from the spool and to lock when a rewinding movement of the spool is initiated, and wherein the drive adaptor is positioned inside the clutch bearing.

16. The apparatus of claim 14, further comprising:
    a power spring band affixed at a first end to an interior surface inside an area of the first cylindrical lip and affixed at a second end to the clutch bearing, and wherein the power spring band is comprised of an elastic material that extends as the first cable spool and the second cable spool are rotated.

17. The apparatus of claim 16, further comprising:
    an electronic data interface affixed to one end of the cable and resting against an orifice in a supporting protrusion affixed to the first cable spool and the second cable spool.

18. The apparatus of claim 17, wherein the electronic data interface is at least one of a video graphics adaptor (VGA), a universal serial bus (USB) interface and a high definition multimedia interface (HDMI).

* * * * *